United States Patent
Chen

(10) Patent No.: US 12,273,131 B2
(45) Date of Patent: *Apr. 8, 2025

(54) RF SYSTEM AND ELECTRONIC DEVICE

(71) Applicant: GUANGDONG OPPO MOBILE TELECOMMUNICATIONS CORP., LTD., Guangdong (CN)

(72) Inventor: Xianlong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 255 days.

This patent is subject to a terminal disclaimer.

(21) Appl. No.: 17/814,027

(22) Filed: Jul. 21, 2022

(65) Prior Publication Data

US 2022/0368357 A1 Nov. 17, 2022

Related U.S. Application Data

(63) Continuation of application No. PCT/CN2020/133122, filed on Dec. 1, 2020.

(30) Foreign Application Priority Data

Jan. 22, 2020 (CN) .......................... 202010074934.5

(51) Int. Cl.
*H04L 12/00* (2006.01)
*H04B 1/00* (2006.01)
(Continued)

(52) U.S. Cl.
CPC ............. *H04B 1/0064* (2013.01); *H04B 1/44* (2013.01); *H04B 7/0404* (2013.01); *H04L 5/1461* (2013.01)

(58) Field of Classification Search
CPC ...... H04B 1/0064; H04B 1/44; H04B 7/0404; H04L 5/1461
See application file for complete search history.

(56) References Cited

U.S. PATENT DOCUMENTS 11,239,889 B2 * 2/2022 Obiya .................. H04B 1/0057
11,405,059 B2   8/2022 Pehlke
(Continued)

FOREIGN PATENT DOCUMENTS

| CN | 101741441 | 6/2010 |
| CN | 105634569 | 6/2016 |

(Continued)

OTHER PUBLICATIONS

EPO, Extended European Search Report for EP Application No. 20915824.5, May 26, 2023.
(Continued)

*Primary Examiner* — Ajit Patel
*Assistant Examiner* — Lionel Preval
(74) *Attorney, Agent, or Firm* — Hodgson Russ LLP

(57) ABSTRACT

A RF system and an electronic device are provided. The RF system includes an RF transceiver, an RF processing circuit, a transfer switch module, and four antennas. The RF processing circuit includes a first TX module, a second TX module, a first RX module, a second RX module, a first duplexer, a second duplexer, a first multiplexer, and a first filtering module. When the RF system works in a NSA mode, a first antenna is configured for TX of a first LB and PRX of the first LB, a second antenna is configured for TX of a second LB and PRX of the second LB, a third antenna is configured for DRX of the second LB, a fourth antenna is configured for DRX of the first LB, and the first filtering module is configured to filter a band other than the first LB.

20 Claims, 5 Drawing Sheets

(51) Int. Cl.
*H04B 1/44* (2006.01)
*H04B 7/0404* (2017.01)
*H04L 5/14* (2006.01)

(56) References Cited

U.S. PATENT DOCUMENTS

| | | | | |
|---|---|---|---|---|
| 11,652,505 | B2* | 5/2023 | Chen | H04B 1/44 |
| | | | | 370/278 |
| 2010/0135193 | A1 | 6/2010 | Przadka | |
| 2013/0230080 | A1 | 9/2013 | Gudem et al. | |
| 2014/0227982 | A1* | 8/2014 | Granger-Jones | H04B 1/006 |
| | | | | 455/77 |
| 2014/0342678 | A1 | 11/2014 | Khlat | |
| 2016/0374108 | A1 | 12/2016 | Lee et al. | |
| 2017/0245317 | A1 | 8/2017 | Lee et al. | |
| 2019/0027822 | A1 | 1/2019 | Ayala Vazquez et al. | |
| 2019/0090297 | A1 | 3/2019 | Lan et al. | |
| 2019/0229764 | A1 | 7/2019 | Kang et al. | |
| 2020/0076565 | A1 | 3/2020 | Lan et al. | |
| 2020/0313714 | A1* | 10/2020 | Ono | H04B 1/006 |
| 2021/0194515 | A1* | 6/2021 | Go | H04B 1/401 |
| 2022/0131560 | A1* | 4/2022 | Zhang | H04B 1/0057 |

FOREIGN PATENT DOCUMENTS

| | | |
|---|---|---|
| CN | 106129588 | 11/2016 |
| CN | 106656248 | 5/2017 |
| CN | 207427152 | 5/2018 |
| CN | 108199728 | 6/2018 |
| CN | 108232473 | 6/2018 |
| CN | 108322227 | 7/2018 |
| CN | 207947761 | 10/2018 |
| CN | 109274379 | 1/2019 |
| CN | 109361444 | 2/2019 |
| CN | 109743072 | 5/2019 |
| CN | 109861735 | 6/2019 |
| CN | 110086481 | 8/2019 |
| CN | 110166073 | 8/2019 |
| CN | 110190860 | 8/2019 |
| CN | 110233656 | 9/2019 |
| CN | 110365359 | 10/2019 |
| CN | 110635821 | 12/2019 |
| CN | 111193526 | 5/2020 |
| CN | 111277278 | 6/2020 |
| EP | 3182630 | 6/2017 |
| EP | 3344005 | 7/2018 |
| EP | 3416452 | 12/2018 |

OTHER PUBLICATIONS

WIPO, International Search Report and Written Opinion for International Application No. PCT/CN2020/133122, Mar. 3, 2021.
CNIPA, First Office Action for CN Application No. 202010074934.5, Apr. 1, 2021.
CNIPA, Notification to Grant Patent Right for Invention for CN Application No. 202010074934.5, Nov. 2, 2021.
EPO, Extended European Search Report for EP Application No. 21151428.6, Jun. 2, 2021.
USPTO, Non-Final Office Action for U.S. Appl. No. 17/148,333, filed Sep. 16, 2022.
WIPO, International Search Report and Written Opinion for International Application No. PCT/CN2021/071721, Mar. 29, 2021.

* cited by examiner

RF SYSTEM AND ELECTRONIC DEVICE

CROSS-REFERENCE TO RELATED APPLICATIONS

This application is a continuation of International Application No. PCT/CN2020/133122, filed Dec. 1, 2020, which claims priority to Chinese Patent Application No. 202010074934.5, filed Jan. 22, 2020, the entire disclosures of which are incorporated herein by reference.

TECHNICAL FIELD

This application relates to the technical field of electronic devices, and specifically to a radio frequency (RF) system and an electronic device.

BACKGROUND

With wide popularity and application of electronic devices such as smartphones, the smartphone can support an increasing number of applications and are increasingly more powerful in function. The smartphone is developing towards diversification and personalization and has become an indispensable electronic product in users' life. In a $4^{th}$ generation (4G) mobile communication system, the electronic device usually adopts a single-antenna radio frequency (RF) system architecture or a dual-antenna RF system architecture. An RF architecture in a 4G scheme is relatively simple and includes a transmit (TX) device, a receive (RX) device, a transfer switch, and an antenna. The TX device may include a low-band (LB) TX module and a middle-high-band (MHB) TX module. The RX device may include a primary receive (PRX) module and a diversity receive (DRX) module. A RX path between the PRX module, the transfer switch, and the antenna is a PRX path. A RX path between the DRX module, the transfer switch, and the antenna is a DRX path. The transfer switch can intelligently switch between the PRX path and the DRX path. A current 4G RF architecture can only realize TX and RX of a single LB.

SUMMARY

In a first aspect, an RF system is provided in implementations of the disclosure. The RF system includes an RF transceiver, an RF processing circuit, a transfer switch module, a first antenna, a second antenna, a third antenna, and a fourth antenna. The RF transceiver is coupled with the RF processing circuit. The first antenna and the second antenna are coupled with the transfer switch module, the third antenna is coupled with the transfer switch module or the RF processing circuit, the fourth antenna is coupled with the RF processing circuit. The first antenna and the second antenna each have a higher antenna efficiency than the third antenna and the fourth antenna. The RF processing circuit includes a first transmit (TX) module, a second TX module, a first receive (RX) module, a second RX module, a first duplexer, a second duplexer, a first multiplexer, and a first filtering module. The first TX module has a first TX port that is coupled with the transfer switch module via the first duplexer, and the first TX module has a second TX port that is coupled with the transfer switch module via the first multiplexer and the second duplexer. The second TX module has a first TX port that is coupled with the transfer switch module, and the second TX module has a second TX port that is coupled with the transfer switch module via the first multiplexer and the second duplexer. The first RX module has a first RX port that is coupled with the transfer switch module via the first duplexer, the first RX module has a second RX port that is coupled with the transfer switch module via the second duplexer, and the first RX module has a third RX port that is coupled with the transfer switch module via the second TX module. The second RX module has a first RX port that is coupled with the first filtering module, and the second RX module has a second RX port that is coupled with the transfer switch module or a selective filtering module that is coupled with the third antenna. When the RF system works in a non-standalone (NSA) mode, the first antenna is configured for TX of a first LB and primary receive (PRX) of the first LB, the second antenna is configured for TX of a second LB and PRX of the second LB, the third antenna is configured for diversity receive (DRX) of the second LB, the fourth antenna is configured for DRX of the first LB, and the first filtering module is configured to filter a band other than the first LB.

In a second aspect, an electronic device is provided in implementations of the disclosure. The electronic device includes an RF system in the first aspect. The RF system is configured to perform TX and RX of a first LB and perform TX and RX of a second LB when working in an NSA mode.

BRIEF DESCRIPTION OF THE DRAWINGS

In order to describe more clearly technical solutions of implementations of the disclosure or the related art, the following will give a brief introduction to the accompanying drawings used for describing the implementations or the related art. Apparently, the accompanying drawings described below are merely some implementations of the disclosure. Based on these drawings, those of ordinary skill in the art can also obtain other drawings without creative effort.

DETAILED DESCRIPTION

The following will describe clearly and comprehensively technical solutions of implementations of the disclosure with reference to the accompanying drawings of implementations of the disclosure. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

The terms "first", "second", and the like used in the specification, the claims, and the above accompany drawings of the disclosure are used to distinguish different objects rather than describe a particular order. In addition, the terms "include", "comprise", and "have" as well as variations thereof are intended to cover non-exclusive inclusion. For example, a process, system, product, or device including a series of steps or units is not limited to the listed steps or units, and instead, it can optionally include other steps or units that are not listed, or other steps or units inherent to the process, product, or device can also be included.

The term "embodiment" or "implementation" referred to herein means that a particular feature, structure, or characteristic described in conjunction with the implementation may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

An electronic device involved in implementations of the disclosure may include various devices with wireless communication functions such as handheld devices (such as mobile phones, tablet computers, etc.), in-vehicle devices, wearable devices, computing devices or other processing devices connected to a wireless modem, and various forms of user equipments (UEs) (such as mobile phones), mobile stations (MSs), terminal devices, etc. For the convenience of illustration, the devices mentioned above are collectively referred to as the electronic device.

Figure 1:
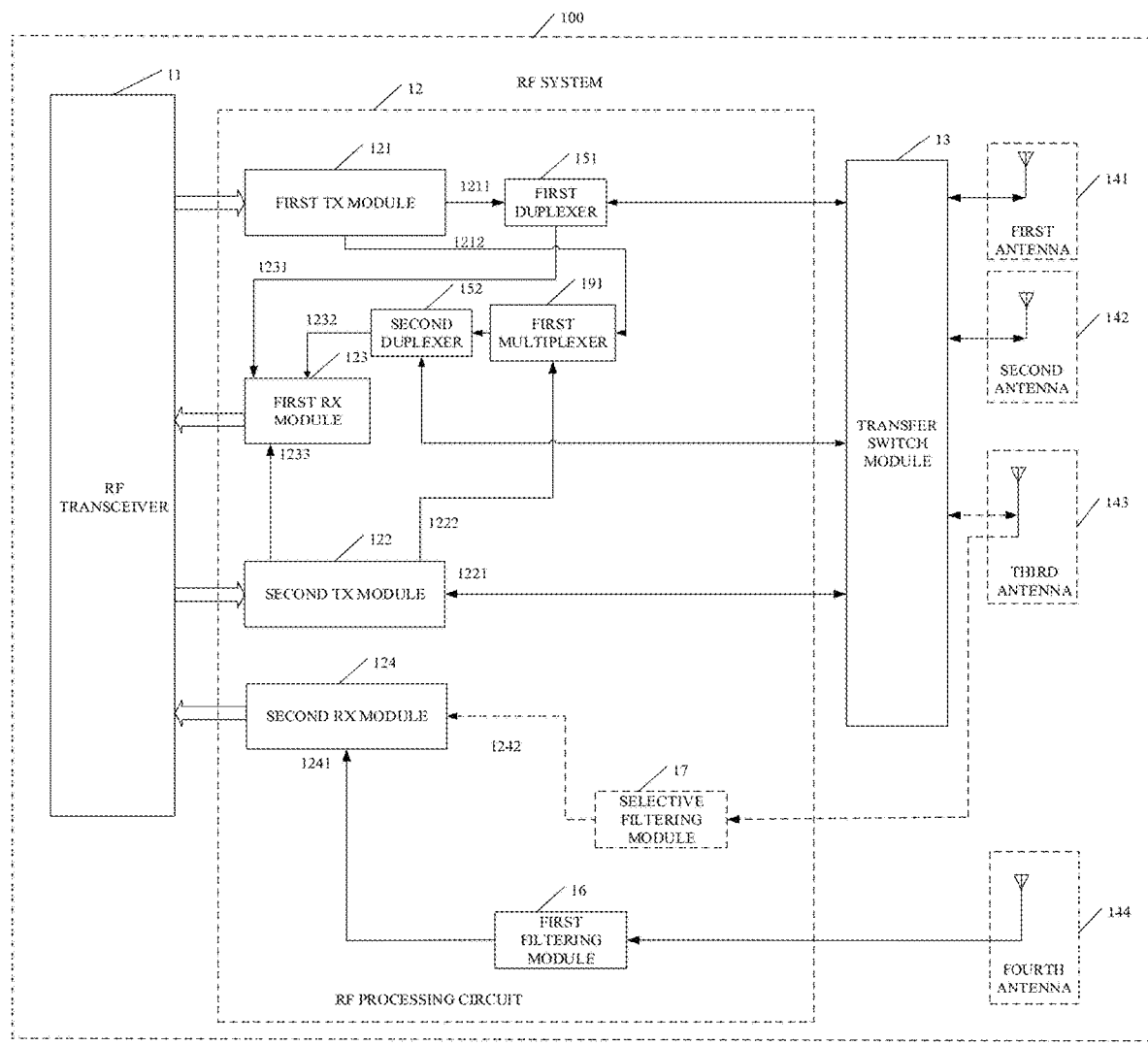
FIG. 1 is a schematic structural diagram of a radio frequency (RF) system provided in implementations of the disclosure.

Refer to FIG. 1, which is a schematic structural diagram of a radio frequency (RF) system provided in implementations of the disclosure. The RF system 100 includes an RF transceiver 11, an RF processing circuit 12, a transfer switch module 13, a first antenna 141, a second antenna 142, a third antenna 143, and a fourth antenna 144. The RF transceiver 11 is coupled with the RF processing circuit 12. The first antenna 141 and the second antenna 142 are coupled with the transfer switch module 13, the third antenna 143 is coupled with the transfer switch module 13 or the RF processing circuit 12, the fourth antenna 144 is coupled with the RF processing circuit 12. The first antenna 141 and the second antenna 142 each have a higher antenna efficiency than the third antenna 143 and the fourth antenna 144.

The RF processing circuit 12 includes a first transmit (TX) module 121, a second TX module 122, a first receive (RX) module 123, a second RX module 124, a first duplexer 151, a second duplexer 152, a first multiplexer 191, and a first filtering module 16. The first TX module 121 has a first TX port 1211 that is coupled with the transfer switch module 13 via the first duplexer 151, and the first TX module 121 has a second TX port 1212 that is coupled with the transfer switch module 13 via the first multiplexer 191 and the second duplexer 152. The first TX module 121 is configured to be coupled with one of the first antenna 141 and the second antenna 142 via the transfer switch module 13. The second TX module 122 has a first TX port 1221 that is coupled with the transfer switch module 13, and the second TX module 122 has a second TX port 1222 that is coupled with the transfer switch module 13 via the first multiplexer 191 and the second duplexer 152. The second TX module 122 is configured to be coupled with another one of the first antenna 141 and the second antenna 142 via the transfer switch module 13. The first RX module 123 has a first RX port 1231 that is coupled with the transfer switch module 13 via the first duplexer 151, the first RX module 123 has a second RX port 1232 that is coupled with the transfer switch module 13 via the second duplexer 152, and the first RX module 123 has a third RX port 1233 that is coupled with the transfer switch module 13 via the second TX module 123. The second RX module 124 has a first RX port 1241 that is coupled with the first filtering module 16, and the second RX module 124 has a second RX port 1242 that is coupled with the transfer switch module 13 or a selective filtering module 17 that is coupled with the third antenna 143.

The first TX module 121 is capable to be switched to be coupled with one of the first antenna 141 and the second antenna 142 via the transfer switch module 13, and the second TX module 121 is capable to be switched to be coupled with another one of the first antenna 141 and the second antenna 142 via the transfer switch module 13.

When the RF system works in a non-standalone (NSA) mode, the first antenna 141 is configured for TX of a first low band (LB) and primary receive (PRX) of the first LB, the second antenna 142 is configured for TX of a second LB and PRX of the second LB, the third antenna 143 is configured for diversity receive (DRX) of the second LB, the fourth antenna 144 is configured for DRX of the first LB, and the first filtering module is configured to filter a band other than the first LB.

Antenna efficiency is how much RF power delivered to the antenna (from radio) is actually transmitted into the air. The Antenna efficiency relates the power delivered to the antenna and the power radiated or dissipated within the antenna. A high efficiency antenna has most of the power present at the antenna's input radiated away. A low efficiency antenna has most of the power absorbed as losses within the antenna, or reflected away due to impedance mismatch.

In implementations of the disclosure, the NSA mode includes any one of an evolved universal mobile telecommunication system (UMTS) terrestrial radio access (E-UTRA) new radio (NR)-dual connectivity (EN-DC) architecture, an NR E-UTRA-DC (NE-DC) architecture, or a next generation (NG) EN-DC architecture.

In an EN-DC architecture, an electronic device is connected to a $4^{th}$ generation (4G) core network. A 4G base station is a primary station, and a $5^{th}$ generation (5G) base station is a secondary station.

In an NE-DC architecture, a 5G core network is introduced. A 5G base station is a primary station, and a 4G base station is a secondary station.

In an NG EN-DC architecture, a 5G core network is introduced. A 4G base station is a primary station, and a 5G base station is a secondary station.

DC represents dual connectivity. E represents evolved-UTRA (E-UTRA or EUTRA), that is, 4G radio access network. N represents NR, that is, 5G NR. NG represents next generation core network, that is, 5G core network.

EN-DC refers to DC of the 4G radio access network with the 5G NR. NE-DC refers to DC of the 5G NR with the 4G radio access network. NG EN-DC refers to DC of the 4G radio access network and the 5G NR in a 5G core network.

For the convenience of illustration, the following will take the EN-DC architecture as an example of the NSA mode for illustration.

In the EN-DC architecture, the RF system in implementations of the disclosure is operable in LB+LB NSA. LB+LB NSA means that LB long term evolution (LTE)+LB NR work together. Two power amplifiers (PAs) are required to work together for TX of signals. In addition, for each of the LB LTE and the LB NR, two antennas are needed, in which one antenna is configured for TX or PRX and the other antenna is configured for DRX. Therefore, 4 antennas are required for realizing LB+LB NSA. Since an LB antenna is too large in size, for a small-sized electronic device (such as mobile phone), a clearance zone reserved for the LB antenna is relatively small, and it is hard to meet requirements on clearance zone of 4 LB antennas at the same time, it is difficult to make 4 LB antennas with a high antenna efficiency. In order to ensure reliability of uplink signals, it is possible that two of the 4 antennas that have a relatively high antenna efficiency are configured for TX of an LB LTE signal and TX of an LB NR signal.

In implementations of the disclosure, the first LB may include a 4G band, for example, B20 (uplink: 83~862 megahertz (MHz), downlink: 791~821 MHz) or B28 (uplink: 703~748 MHz, downlink: 758~803 MHz). The second LB may include a 5G band, for example, N5 (uplink: 824~849 MHz, downlink: 869~894 MHz), or N8 (uplink: 880~915 MHz, downlink: 925~960 MHz), or N28 (uplink: 703~748 MHz, downlink: 758~803 MHz). It is to be noted that, B5 in the 4G band has the same frequency range as N5 in the 5G band. B8 in the 4G band has the same frequency range as N8 in the 5G band. B28 in the 4G band has the same frequency range as N28 in the 5G band.

In the EN-DC architecture, the first antenna 141 is configured for TX of the first LB and PRX of the first LB, the second antenna 142 is configured for TX of the second LB and PRX of the second LB, the third antenna 143 is configured DRX of the second LB, and the fourth antenna 144 is configured for DRX of the first LB. For example, the first antenna 141 is configured for TX and PRX of B20 or B28; the second antenna 142 is configured for TX and PRX of N5, or N8, or N28; the third antenna 143 is configured for DRX of N5, or N8, or N28; and the fourth antenna 144 is configured for DRX of B20 or B28.

In implementations of the disclosure, a TX path of the first LB includes: the RF transceiver 11→the first TX module 121→the first duplexer 151→the transfer switch module 13→the first antenna 141, or the RF transceiver 11→the first TX module 121→the first multiplexer 191→the second duplexer 152→the transfer switch module 13→the first antenna 141, or the RF transceiver 11→the second TX module 122→the transfer switch module 13→the first antenna 141, or the RF transceiver 11→the second TX module 122→the first multiplexer 191→the second duplexer 152→the transfer switch module 13→the first antenna 141.

A PRX path of the first LB includes: the first antenna 141→the transfer switch module 13→the first duplexer 151→the first RX module 123→the RF transceiver 11, or the first antenna 141→the transfer switch module 13→the second duplexer 152→the first RX module 123→the RF transceiver 11, or the first antenna 141→the transfer switch module 13→the second TX module 122→the first RX module 123→the RF transceiver 11.

A DRX path of the first LB includes: the fourth antenna 144→the first filtering module 16→the second RX module 124→the RF transceiver 11, or the third antenna 143→the transfer switch module 13→the second RX module 124→the RF transceiver 11, or the third antenna 143→the selective filtering module 17→the second RX module 124→the RF transceiver 11.

A TX path of the second LB includes: the RF transceiver 11→the first TX module 121→the first duplexer 151→the transfer switch module 13→the second antenna 142, or the RF transceiver 11→the first TX module 121→the first multiplexer 191→the second duplexer 152→the transfer switch module 13→the second antenna 142, or the RF transceiver 11→the second TX module 122→the transfer switch module 13→the second antenna 142, or the RF transceiver 11→the second TX module 122→the first multiplexer 191→the second duplexer 152→the transfer switch module 13→the second antenna 142.

A PRX path of the second LB includes: the second antenna 142→the transfer switch module 13→the second duplexer 152→the first RX module 123→the RF transceiver 11, or the second antenna 142→the transfer switch module 13→the second TX module 122→the first multiplexer 191→the second duplexer 152→the first RX module 123→the RF transceiver 11, or the second antenna 142→the transfer switch module 13→the second TX module 122→the first RX module 123→the RF transceiver 11.

A DRX path of the second LB includes: the third antenna 143→the transfer switch module 13→the second RX module 124→the RF transceiver 11, or the third antenna 143→the selective filtering module 17→the second RX module 124→the RF transceiver 11.

An RF path of the first LB includes the TX path of the first LB, the PRX path of the first LB, and the DRX path of the first LB. An RF path of the second LB includes the TX path of the second LB, the PRX path of the second LB, and the DRX path of the second LB.

The RF path of the first LB (such as LB LTE band) is only for signal TX, signal PRX, and signal DRX. The RF path of the second LB (LB NR band) is for signal TX, signal PRX, signal DRX, multiple-input multiple-output (MIMO) PRX, and signal MIMO DRX.

The first LB includes a first sub-band or a second sub-band. The second LB includes a third sub-band, a fourth sub-band, or a fifth sub-band.

For example, the first sub-band is B20 (uplink: 832~862 MHz, downlink: 791~821 MHz). The second sub-band is B28 (uplink: 703~748 MHz, downlink: 758~803 MHz). The third sub-band is N5 (uplink: 824~849 MHz, downlink: 869~894 MHz) or B5. The fourth sub-band is N8 (uplink: 880~915 MHz, downlink: 925~960 MHz) or B8. The fifth sub-band is N28 (uplink: 703~748 MHz, downlink: 758~803 MHz) or B28.

Specifically, in the NSA mode, the first sub-band is B20, the second sub-band is B28, the third sub-band is N5, the fourth sub-band is N8, and the fifth sub-band is N28. In a 4G mode, the first sub-band is B20, the second sub-band is B28, the third sub-band is B5, the fourth sub-band is B8, and the fifth sub-band is B28.

In implementations of the disclosure, the first duplexer 151 can allow to perform TX of the first LB (such as B20) and PRX of the first LB together. The second duplexer 152 can allow to perform TX of the second LB (such as B28A) and PRX of the second LB together.

The first TX module 121 in implementations of the disclosure may include a multi-mode multi-band PA (MMPA). The MMPA may integrate a PA, a switch, etc.

The second TX module 122 in implementations of the disclosure may include a PA module with integrated duplexer (PAMID), where the PAMID is an RF integrated module that integrates a PA, a duplexer, a filter, and a switch. Or the second TX module 122 may be a phase 7 lite device, or the second TX module 122 may be an MMPA that supports NR.

The first RX module 123 in implementations of the disclosure may include a micro low noise amplifier (MLNA), where the MLNA can integrate an LNA and amplify RX signals. Or the first RX module 123 may be a phase 7 lite device, or the first RX module 123 may be an MMPA that supports NR.

The second RX module 124 in implementations of the disclosure may include an L-DRX, where the L-DRX is a RX module that integrates a surface acoustic wave (SAW) and an LNA and is configured to filter and amplify RX signals. The L-DRX may be a phase 7 lite device. Or the second RX module 124 may be implemented by a DFEM and an MLNA, or the second RX module 124 may be implemented by a switch, an SAW, and an MLNA.

The first multiplexer 191 in implementations of the disclosure may include a single pole double throw (SPDT) switch.

The transfer switch module 13 in implementations of the disclosure may include at least one of a double pole triple throw (DP3T) switch or a triple pole triple throw (3P3T) switch. The DP3T switch and the 3P3T switch each may be a fully connected switch.

The DP3T switch may include 3 In-ports and 2 OUT-ports. The 3P3T switch may include 3 In-ports and 3 OUT-ports, which can realize arbitrary In-OUT 3-3 connection switching.

In implementations of the disclosure, 4 antennas are adopted to support DC of the first LB and the second LB, which can realize TX and RX of both the first LB and the second LB at the same time and on the other hand, distribute uplink signals to 2 antennas that have a relatively high antenna efficiency and thus ensure reliability of uplink signals.

In an implementation, when the RF system 100 works in the 4G mode, the first antenna 141 is configured for TX of the first LB and PRX of the first LB, the first antenna 141 is further configured for TX of the second LB and PRX of the second LB, and the second antenna 142 is configured for DRX of the first LB or the second LB.

In implementations of the disclosure, the first LB may include the 4G band, for example, B20 (uplink: 832~862 MHz, downlink: 791~821 MHz) or B28 (uplink: 703~748 MHz, downlink: 758~803 MHz). The second LB may include the 4G band, for example, B5 (uplink: 824~849 MHz, downlink: 869~894 MHz), or B8 (uplink: 880~915 MHz, downlink: 925~960 MHz), or B28 (uplink: 703~748 MHz, downlink: 758~803 MHz).

When the RF system 100 works in the 4G mode, the third antenna 143 and the fourth antenna 144 in the RF system 100 in implementations of the disclosure are unused, or configured only for LB RX, thereby implementing a 4RX/4×4 MIMO function.

In implementations of the disclosure, a TX path of the first LB may include: the RF transceiver 11→the second TX module 122→the transfer switch module 13→the first antenna 141, or the RF transceiver 11→the second TX module 122→the first multiplexer 191→the second duplexer 152→the transfer switch module 13→the first antenna 141, or the RF transceiver 11→the first TX module 121→the first multiplexer 191→the second duplexer 152→the transfer switch module 13→the first antenna 141, or the RF transceiver 11→the first TX module 121→the first duplexer 151→the transfer switch module 13→the first antenna 141.

An RF path of the first LB includes a TX path of the first LB, a PRX path of the first LB, and a DRX path of the first LB. An RF path of the second LB includes a TX path of the second LB, a PRX path of the second LB, and a DRX path of the second LB.

The transfer switch module 13 may include one transfer switch.

In an implementation, if the transfer switch module 13 includes one transfer switch, the transfer switch includes one of a DP3T switch or a 3P3T switch.

In a possible example, if the transfer switch module includes a DP3T switch, the second RX port of the second RX module is coupled with the selective filtering module, and the selective filtering module is coupled with the third antenna.

In a possible example, if the transfer switch module includes a 3P3T switch, the RF processing circuit further includes a second multiplexer and a third multiplexer. The first TX module being coupled with the first antenna via the first duplexer and the transfer switch module specifically includes the following. The first TX module is coupled with the first antenna via the first duplexer, the second multiplexer, and the transfer switch module. The first TX module being coupled with the first antenna via the first multiplexer, the second duplexer, and the transfer switch module specifically includes the following. The first TX module is coupled with the first antenna via the first multiplexer, the second duplexer, the third multiplexer, the second multiplexer, and the transfer switch module.

In implementations of the disclosure, the second multiplexer and the third multiplexer each may include an SPDT switch.

In a possible example, if the transfer switch module includes a 3P3T switch, the second RX port of the second RX module is coupled with the transfer switch module, and the transfer switch module is configured to be coupled with the third antenna.

In a possible example, the selective filtering module includes a first filter, a second filter, a third filter, a first single pole triple throw (SP3T) switch, and a second SP3T switch. The first SP3T switch has a P port that is coupled with the second RX port of the second RX module, the first SP3T switch has a first T port that is coupled with a first port of the first filter, the first SP3T switch has a second T port that is coupled with a first port of the second filter, and the first SP3T switch has a third T port that is coupled with a first port of the third filter. The first filter has a second port that is coupled with a first T port of the second SP3T switch. The second filter has a second port that is coupled with a second T port of the second SP3T switch. The third filter has a second port that is coupled with a third T port of the second SP3T switch. The second SP3T switch has a P port that is coupled with the third antenna. The first filter is configured to filter a band other than the third sub-band, the second filter is configured to filter a band other than the fourth sub-band, and the third filter is configured to filter a band other than the fifth sub-band.

As such, it is possible to achieve signal DRX of the third sub-band, the fourth sub-band, and the fifth sub-band.

In a possible example, the first filtering module includes a first SPDT switch, a second SPDT switch, a fourth filter, and a fifth filter. The first SPDT switch has a P port that is coupled with the first RX port of the second RX module, the first SPDT switch has a first T port that is coupled with a first port of the fourth filter, and the first SPDT switch has a second T port that is coupled with a first port of the fifth filter. The fourth filter has a second port that is coupled with a first T port of the second SPDT switch. The fifth filter has a second port that is coupled with a second T port of the second SPDT switch. The second SPDT switch has a P port that is coupled with the fourth antenna. The fourth filter is configured to filter a band other than the first sub-band, and the fifth filter is configured to filter a band other than the second sub-band.

As such, it is possible to achieve DRX signals of the first sub-band and the second sub-band.

Figure 2:
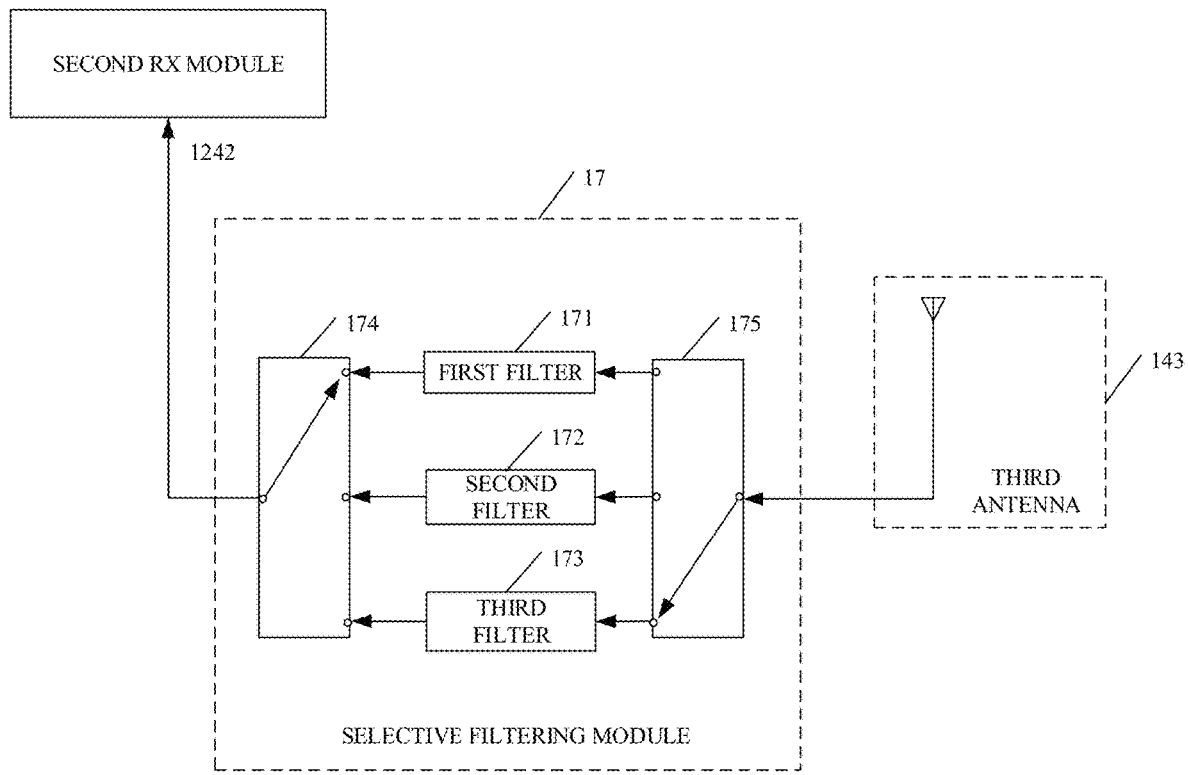
FIG. 2 is a schematic structural diagram of a selective filtering module provided in implementations of the disclosure.

In an implementation, refer to FIG. 2, which is a schematic structural diagram of a selective filtering module 17 provided in implementations of the disclosure. As illustrated in FIG. 2, the selective filtering module 17 includes the first filter 171, the second filter 172, the third filter 173, the first SP3T switch 174, and the second SP3T switch 175. The first SP3T switch 174 has the P port that is coupled with the second RX port 1242 of the second RX module 124, the first SP3T switch 174 has the first T port that is coupled with the first port of the first filter 171, the first SP3T switch 174 has the second T port that is coupled with the first port of the second filter 172, and the first SP3T switch 174 has the third T port that is coupled with the first port of the third filter 173. The first filter 171 has the second port that is coupled with the first T port of the second SP3T switch 175. The second filter 172 has the second port that is coupled with the second T port of the second SP3T switch 175. The third filter 173 has the second port that is coupled with the third T port of the second SP3T switch 175. The second SP3T switch 175 has the P port that is coupled with the third antenna 143. The first filter 171 is configured to filter a band other than the third sub-band, the second filter 172 is configured to filter a band other than the fourth sub-band, and the third filter 173 is configured to filter a band other than the fifth sub-band.

The third sub-band may include N5 (uplink: 824~849 MHz, downlink: 869~894 MHz) or B5. The fourth sub-band may include N8 (uplink: 880~915 MHz, downlink: 925~960 MHz) or B8. The fifth sub-band may include N28 (uplink: 703~748 MHz, downlink: 758~803 MHz) or B28.

Figure 3:
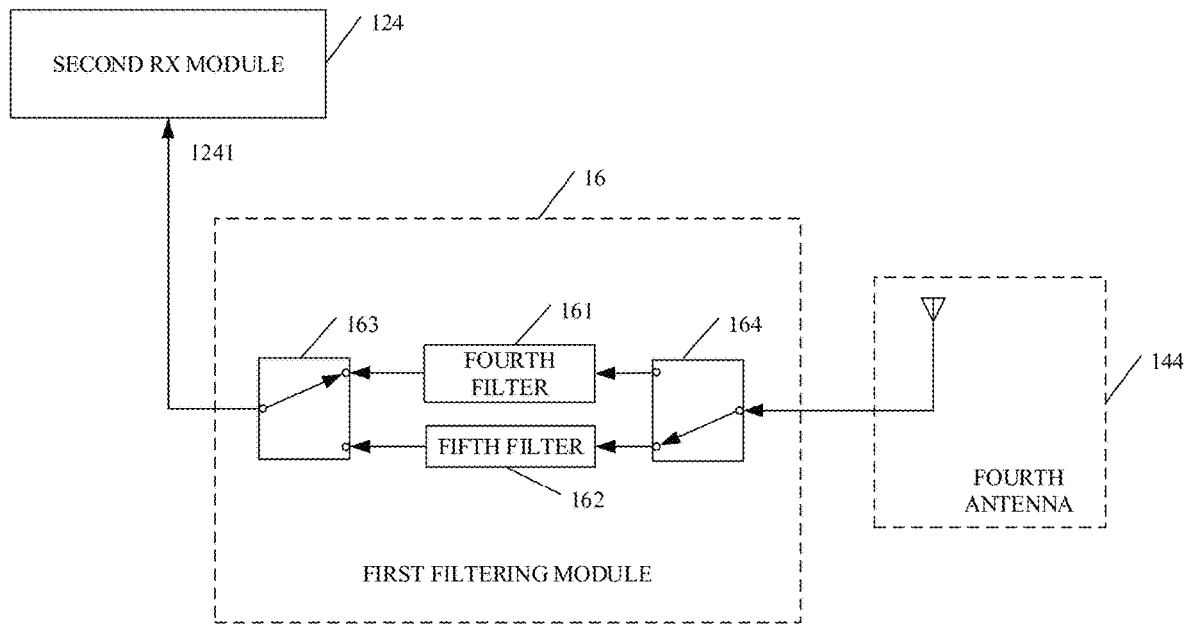
FIG. 3 is a schematic structural diagram of a first filtering module provided in implementations of the disclosure.

In an implementation, refer to FIG. 3, which is a schematic structural diagram of a first filtering module provided in implementations of the disclosure. As illustrated in FIG. 3, the first filtering module 16 includes the first SPDT switch 163, the second SPDT switch 164, the fourth filter 161, and the fifth filter 162. The first SPDT switch 163 has the P port that is coupled with the first RX port 1241 of the second RX module 124, the first SPDT switch 163 has the first T port that is coupled with the first port of the fourth filter 161, and the first SPDT switch 163 has the second T port that is coupled with the first port of the fifth filter 162. The fourth filter 161 has the second port that is coupled with the first T port of the second SPDT switch 164. The fifth filter 162 has the second port that is coupled with the second T port of the second SPDT switch 164. The second SPDT switch 164 has the P port that is coupled with the fourth antenna 144. The fourth filter 161 is configured to filter a band other than the first sub-band, and the fifth filter 162 is configured to filter a band other than the second sub-band.

The first sub-band may include B20 (uplink: 832~862 MHz, downlink: 791~821 MHz). The second sub-band may include B28 (uplink: 703~748 MHz, downlink~758-803 MHz).

A RF system in which a transfer switch module includes a DP3T and a RF system in which a transfer switch module includes a 3P3T will be described in detail with reference to FIG. 4 and FIG. 5 respectively.

Figure 4:
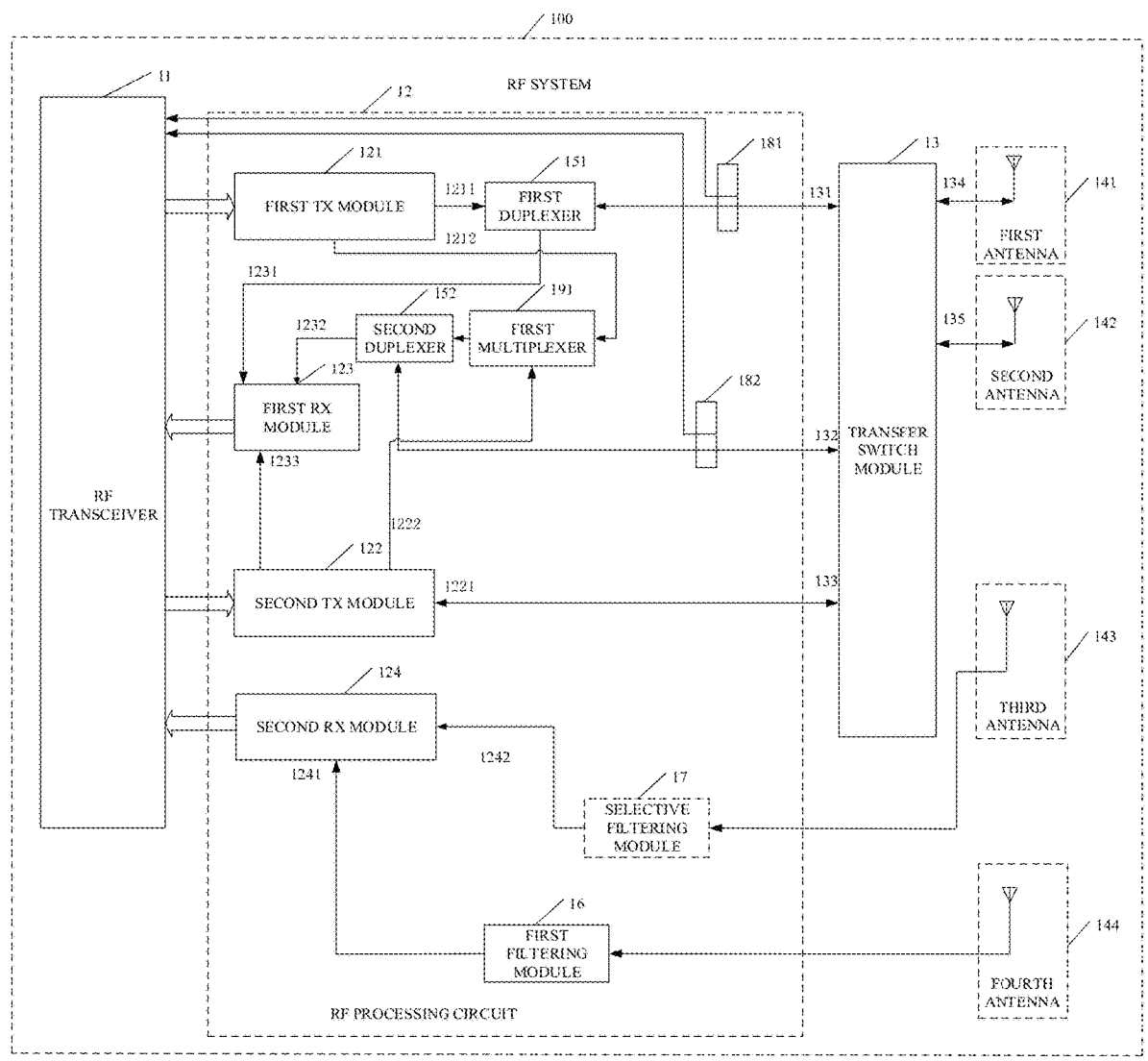
FIG. 4 is a schematic structural diagram of an RF system in which a transfer switch module includes a double pole triple throw (DP3T) switch provided in implementations of the disclosure.

Refer to FIG. 4, which is a schematic structural diagram of an RF system in which a transfer switch module includes a DP3T switch provided in implementations of the disclosure. As illustrated in FIG. 4, the RF system 100 includes the RF transceiver 11, the RF processing circuit 12, a DP3T switch 13, the first antenna 141, the second antenna 142, the third antenna 143, the fourth antenna 144, a directional coupler 181, and a directional coupler 182. The DP3T switch 13 includes a first T port 131, a second T port 132, a third T port 133, a first P port 134, and a second P port 135. The first T port 131 of the DP3T switch 13 is configured to be coupled with the first P port 134 and the first P port 134 is configured to be coupled with the first antenna 141. The second T port 132 of the DP3T switch 13 is configured to be coupled with the first P port 134. The third T port 133 of the DP3T switch 13 is configured to be coupled with the second P port 135 and the second P port 135 is configured to be coupled with the second antenna 142. The RF transceiver 11 is coupled with the RF processing circuit 12. The RF processing circuit 12 includes the first TX module 121, the second TX module 122, the first RX module 123, the second RX module 124, the first duplexer 151, the second duplexer 152, the first multiplexer 191, and the first filtering module 16.

The first TX module 121 is coupled with the first T port 131 of the DP3T switch 13 via the first duplexer 151 and the directional coupler 181; or the first TX module 121 is coupled with the first T port 131 of the DP3T switch 13 via the first multiplexer 191, the second duplexer 152, and the directional coupler 182.

The second TX module 122 is coupled with the third T port 133 of the DP3T switch 13. The first RX module 123 has the first RX port 1231 that is coupled with the T port 131 of the DP3T switch 13 via the first duplexer 151 and the directional coupler 181. The first RX module 123 has the second RX port 1232 that is coupled with the third T port 133 of the DP3T switch 13 via the second duplexer 152, the first multiplexer 191, and the second TX module 122 and coupled with the second T port 132 of the DP3T switch 13 via the second duplexer 152 and the directional coupler 182. The first RX module 123 has the third RX port 1233 that is coupled with third T port 133 of the DP3T switch 13 via the second TX module 122.

The second RX module 124 has the first RX port 1241 that is coupled with the fourth antenna 144 via the first filtering module 16. The second RX module 124 has the second RX port 1242 that is coupled with the third antenna 143 via the selective filtering module 17.

The first antenna 141 and the second antenna 142 each have a higher antenna efficiency than the third antenna 143 and the fourth antenna 144. When the RF system 100 works in the NSA mode, the first antenna 141 is configured for TX of the first LB and PRX of the first LB, the second antenna 142 is configured for TX of the second LB and PRX of the second LB, the third antenna 143 is configured for DRX of the second LB, the fourth antenna 144 is configured for DRX of the first LB, and the first filtering module 16 is configured to filter a band other than the first LB.

The first LB includes the first sub-band or the second sub-band. The second LB includes the third sub-band, the fourth sub-band, or the fifth sub-band.

When the RF system 100 works in the NSA mode, the following will take the first sub-band being B20, the second sub-band being B28A, the third sub-band being N5, the fourth sub-band being N8, and the fifth sub-band being N28A as an example for illustration. B28A is a variant of B28. B28 may be implemented as B28A and B28B. N28A is a variant of N28. N28 may be implemented as N28A and N28B.

Signal flows in a B20+N28A EN-DC are as follows.

TX of B20: the RF transceiver 11 (such as wireless transceiver (WTR))→the first TX module 121 (such as MMPA)→the first duplexer 151 (such as B20 duplexer)→the directional coupler 181→the DP3T switch 13→the first antenna 141.

PRX of B20: the first antenna 141→the DP3T switch 13→the directional coupler 181→the first duplexer 151 (such as B20 duplexer)→the first RX module 123 (such as MLNA)→the RF transceiver 11 (such as WTR).

DRX of B20: the fourth antenna 144→the first filtering module 16 (such as B20+B28 SAW)→the second RX module 124 (such as L-DRX)→the RF transceiver 11 (such as WTR).

TX of N28A: the RF transceiver 11 (such as WTR)→the second TX module 122 (such as LB PAmid)→the DP3T switch 13→the second antenna 142.

PRX of N28A: the second antenna 142→the DP3T switch 13→the second TX module 122 (such as LB PAmid)→the first RX module 123 (such as MLNA)→the RF transceiver 11 (such as WTR).

DRX of N28A: the third antenna 143→the selective filtering module 17→the second RX module 124 (such as L-DRX)→the RF transceiver 11 (such as WTR).

Signal flows in a B20+N8 EN-DC are as follows.

TX of N8: the RF transceiver 11 (such as WTR)→the second TX module 122 (such as LB PAmid)→the DP3T switch 13→the second antenna 142.

PRX of N8: the second antenna 142→the DP3T switch 13→the second TX module 122 (such as LB PAmid)→the first RX module 123 (such as MLNA)→the RF transceiver 11 (such as WTR).

DRX of N8: the third antenna 143→the selective filtering module 17→the second RX module 124 (such as L-DRX)→the RF transceiver 11 (such as WTR).

TX of B20: the RF transceiver 11 (such as WTR)→the first TX module 121 (such as MMPA)→the first duplexer 151 (such as B20 duplexer)→the directional coupler 181→the DP3T switch 13→the first antenna 141.

PRX of B20: the first antenna 141→the DP3T switch 13→the directional coupler 181→the first duplexer 151 (such as B20 duplexer)→the first RX module 123 (such as MLNA)→the RF transceiver 11 (such as WTR).

DRX of B20: the fourth antenna 144→the first filtering module 16 (such as B20+B28 SAW)→the second RX module 124 (such as L-DRX)→the RF transceiver 11 (such as WTR).

Signal flows in a B28A+N5 EN-DC are as follows.

TX of B28A: the RF transceiver 11 (such as WTR)→the first TX module 121 (such as MMPA)→the first multiplexer 191→the second duplexer 152 (such as B28A duplexer)→the directional coupler 182→the DP3T switch 13→the first antenna 141.

PRX of B28A: the first antenna 141→the DP3T switch 13→the directional coupler 182→the second duplexer 152 (such as B28A duplexer)→the first RX module 123 (such as MLNA)→the RF transceiver 11 (such as WTR).

DRX of B28A: the fourth antenna 144→the first filtering module 16 (such as B20+B28 SAW)→the second RX module 124 (such as L-DRX)→the RF transceiver 11 (such as WTR).

TX of N5: the RF transceiver 11 (such as WTR)→the second TX module 122 (such as LB PAmid)→the DP3T switch 13→the second antenna 142.

PRX of N5: the second antenna 142→the DP3T switch 13→the second TX module 122 (such as LB PAmid)→the first RX module 123 (such as MLNA)→the RF transceiver 11 (such as WTR).

DRX of N5: the third antenna 143→the selective filtering module 17→the second RX module 124 (such as L-DRX)→the RF transceiver 11 (such as WTR).

Signal flows when working in an LTE ONLY mode are as follows.

TX of B28: RF transceiver 11 (such as WTR)→the second TX module 122 (such as LB PAmid)→the first multiplexer 191→the second duplexer 152 (such as B28A duplexer)→the directional coupler 182→the DP3T switch 13→the first antenna 141.

TX of B5/B8/B20: the RF transceiver 11 (WTR)→the second TX module 122 (such as LB PAmid)→the DP3T switch 13→the first antenna 141.

PRX of B28: the first antenna 141→the DP3T switch 13→the directional coupler 182→the second duplexer 152 (such as B28A duplexer)→the first RX module 123 (such as MLNA)→the RF transceiver 11 (such as WTR).

PRX of B5/B8/B20: the first antenna 141→the DP3T switch 13→the directional coupler 181→the first duplexer 151 (such as B20 duplexer)→the first RX module 123 (such as MLNA)→the RF transceiver 11 (such as WTR).

DRX of B20/B28: the fourth antenna 142→the first filtering module 16 (such as B20+B28 SAW)→the second RX module 124 (such as L-DRX)→the RF transceiver 11 (such as WTR).

The B20+B28 SAW can reserve B20 and B28 and filter other bands.

The directional coupler 181 and the directional coupler 182 each can mix two RF signals for output. In an implementation, the directional coupler 181 and the directional coupler 182 can further have a power allocation function and be configured to divide a power of an input signal into several paths and feed back to a RX port of the RF transceiver 11, such that the RF transceiver 11 can adjust a power of an RF signal transmitted by the RF transceiver 11.

In an implementation, when the RF system 100 works in the 4G mode, the first antenna 141 is configured for TX of the first LB and PRX of the first LB, the first antenna 141 is further configured for TX of the second LB and PRX of the second LB, and the second antenna 142 is configured for DRX of the first LB or the second LB.

Figure 5:
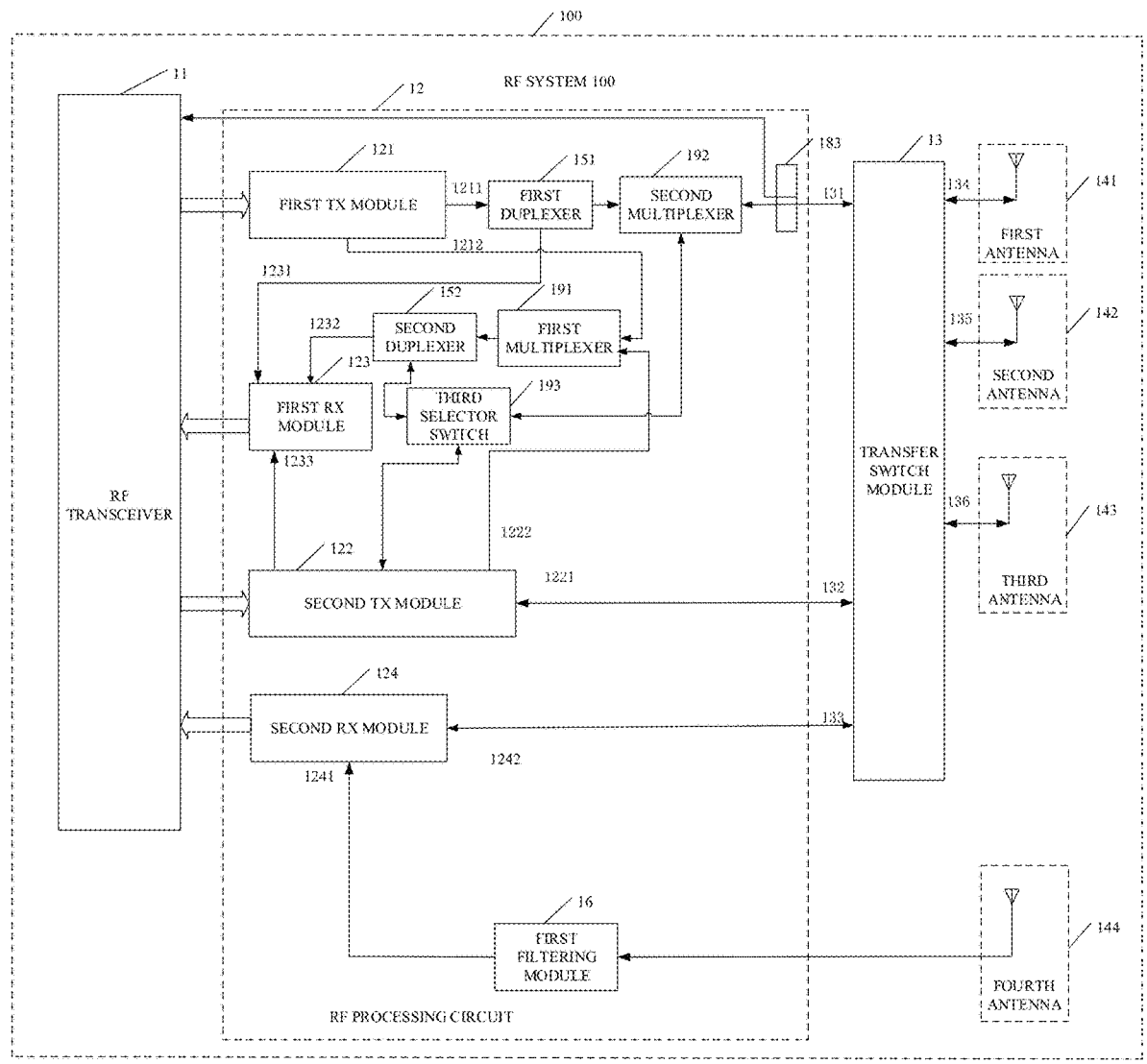
FIG. 5 is a schematic structural diagram of an RF system in which a transfer switch module includes a triple pole triple throw (3P3T) switch provided in implementations of the disclosure.

In an implementation, refer to FIG. 5, which is a schematic structural diagram of an RF system in which a transfer switch module includes a 3P3T switch provided in implementations of the disclosure. As illustrated in FIG. 5, the RF system 100 includes the RF transceiver 11, the RF processing circuit 12, a 3P3T switch 13, the first antenna 141, the second antenna 142, the third antenna 143, the fourth antenna 144, and a directional coupler 183. The 3P3T switch 13 includes a first T port 131, a second T port 132, a third T port 133, a first P port 134, a second P port 135, and a third P port 136. The first T port 131 is configured to be coupled with the first P port 134 and the first P port 134 is configured to be coupled with the first antenna 141. The second T port 132 is configured to be coupled with the second P port 135 and the second P port 135 is configured to be coupled with the second antenna 142. The third T port 133 is configured to be coupled with the third P port 136 and the second P port 136 is configured to be coupled with the third antenna 143.

The RF transceiver 11 is coupled with the RF processing circuit 12. The RF processing circuit 12 includes the first TX module 121, the second TX module 122, the first RX module 123, the second RX module 124, the first duplexer 151, the second duplexer 152, the first multiplexer 191, the second multiplexer 192, the third multiplexer 193, and the first filtering module 16.

The first TX module 121 is coupled with the first T port 131 via the first duplexer 151, the second multiplexer 192, and the directional coupler 183; or the first TX module 121 is coupled with the first T port 131 via the first multiplexer 191, the second duplexer 152, the third multiplexer 193, and the second multiplexer 192, and the directional coupler 183.

The second TX module 122 is coupled with the second T port 132.

The first RX module 123 has the first RX port 1231 that is coupled with the first T port 131 via the first duplexer 151, the second multiplexer 192, and the directional coupler 183. The first RX module 123 has the second RX port 1232 that is coupled with the first T port 131 via the second duplexer 152, the third multiplexer 193, the second multiplexer 192, and the directional coupler 183 and coupled with the second T port 132 via the second duplexer 152, the first multiplexer 191, the second TX module 122, and the 3P3T switch 13. The first RX module 123 has the third RX port 1233 that is coupled with second T port 132 via the second TX module 122.

The second RX module 124 has the second RX port 1242 that is coupled with the third T port 133. The second RX module 124 has the first RX port 1241 that is coupled with the fourth antenna 144 via the first filtering module 16. The first antenna 141 and the second antenna 142 each have a higher antenna efficiency than the third antenna 143 and the fourth antenna 144. When the RF system 100 works in the NSA mode, the first antenna 141 is configured for TX of the first LB and PRX of the first LB, the second antenna 142 is configured for TX of the second LB and PRX of the second LB, and the third antenna 143 is configured for DRX of the second LB, the fourth antenna 144 is configured for DRX of the first LB, and the first filtering module 16 is configured to filter a band other than the first LB.

The first LB includes the first sub-band or the second sub-band, and the second LB includes the third sub-band, the fourth sub-band, or the fifth sub-band.

When the RF system 100 works in the NSA mode, the following will take the first sub-band being B20, the second sub-band being B28A, the third sub-band being N5, the fourth sub-band being N8, and the fifth sub-band being N28A as an example for illustration. B28A is a variant of B28. B28 may be implemented as B28A and B28B. N28A is a variant of N28. N28 may be implemented as N28A and N28B.

Signal flows in a B20+N28A EN-DC are as follows.

TX of B20: the RF transceiver 11 (such as WTR)→the first TX module 121 (such as MMPA)→the first duplexer 151 (such as B20 duplexer)→the second multiplexer 192→the directional coupler 183→the 3P3T switch 13→the first antenna 141.

PRX of B20: the first antenna 141→the 3P3T switch 13→the directional coupler 183→the second multiplexer 192→the first duplexer 151 (such as B20 duplexer)→the first RX module 123 (such as MLNA)→the RF transceiver 11 (such as WTR).

DRX of B20: the fourth antenna 144→the first filtering module 16 (such as B20+B28 SAW)→the second RX module 124 (such as L-DRX)→the RF transceiver 11 (such as WTR).

TX of N28A: the RF transceiver 11 (such as WTR)→the second TX module 122 (such as LB PAmid)→the 3P3T switch 13→the second antenna 142.

PRX of N28A: the second antenna 142→the 3P3T switch 13→the second TX module 122 (such as LB PAmid)→the first RX module 123 (such as MLNA)→the RF transceiver 11 (such as WTR).

DRX of N28A: the third antenna 143→the 3P3T switch 13→the second RX module 124 (such as L-DRX)→the RF transceiver 11 (such as WTR).

Signal flows in a B20+N8 EN-DC are as follows.

TX of N8: the RF transceiver 11 (such as WTR)→the second TX module 122 (such as LB PAmid)→the 3P3T switch 13→the second antenna 142.

PRX of N8: the second antenna 142→the 3P3T switch 13→the second TX module 122 (such as LB PAmid)→the first RX module 123 (such as MLNA)→the RF transceiver 11 (such as WTR).

DRX of N8: the third antenna 143→the 3P3T switch 13→the second RX module 124 (such as L-DRX)→the RF transceiver 11 (such as WTR).

TX of B20: the RF transceiver 11 (such as WTR)→the first TX module 121 (such as MMPA)→the first duplexer 151 (such as B20 duplexer)→the second multiplexer 192→the directional coupler 183→the 3P3T switch 13→the first antenna 141.

PRX of B20: the first antenna 141→the 3P3T switch 13→the directional coupler 181→the second multiplexer 192→the first duplexer 151 (such as B20 duplexer)→the first RX module 123 (such as MLNA)→the RF transceiver 11 (such as WTR).

DRX of B20: the fourth antenna 144→the first filtering module 16 (such as B20+B28 SAW)→the second RX module 124 (such as L-DRX)→the RF transceiver 11 (such as WTR).

Signal flows in a B28A+N5 EN-DC are as follows.

TX of B28A: the RF transceiver 11 (such as WTR)→the first TX module 121 (such as MMPA)→the first multiplexer 191→the second duplexer 152 (such as B28A duplexer)→the third multiplexer 193→the second multiplexer 192→the directional coupler 183→the 3P3T switch 13→the first antenna 141.

PRX of the B28A: the first antenna 141→the 3P3T switch 13→the directional coupler 183→the second multiplexer 192→the third multiplexer 193→the second duplexer 152 (such as B28A duplexer)→the first RX module 123 (such as MLNA)→the RF transceiver 11 (such as WTR).

DRX of B28A: the fourth antenna 144→the first filtering module 16 (such as B20+B28 SAW)→the second RX module 124 (such as L-DRX)→the RF transceiver 11 (such as WTR).

TX of N5: the RF transceiver 11 (such as WTR)→the second TX module 122 (such as LB PAmid)→the 3P3T switch 13→the second antenna 142.

PRX of N5: the second antenna 142→the 3P3T switch 13→the second TX module 122 (such as LB PAmid)→the first RX module 123 (such as MLNA)→the RF transceiver 11 (such as WTR).

DRX of N5: the third antenna 143→the selective filtering module 17→the second RX module 124 (such as L-DRX)→the RF transceiver 11 (such as WTR).

Signal flows when working in an LTE ONLY mode are as follows.

TX of B28: the RF transceiver 11 (such as WTR)→the second TX module 122 (such as LB PAmid)→the first multiplexer 191→the second duplexer 152 (such as B28A duplexer)→the third multiplexer 193→the second multiplexer 192→the directional coupler 183→the 3P3T switch 13→the first antenna 141.

TX of B5/B8/B20: the RF transceiver 11 (such as WTR)→the second TX module 122 (such as LB PAmid)→the 3P3T switch 13→the first antenna 141.

PRX of B28: the first antenna 141→the 3P3T switch 13→the directional coupler 183→the second multiplexer 192→the third multiplexer 193→the second duplexer 152 (such as B28A duplexer)→the first RX module 123 (such as MLNA)→the RF transceiver 11 (such as WTR).

PRX of B5/B8/B20: the first antenna 141→the 3P3T switch 13→the directional coupler 183→the second multiplexer 192→the first duplexer 151→the first RX module 123 (such as MLNA)→the RF transceiver 11 (such as WTR).

DRX of B20/B28: the fourth antenna 142→the first filtering module 16 (such as B20+B28 SAW)→the second RX module 124 (such as L-DRX)→the RF transceiver 11 (such as WTR).

The B20+B28 SAW may reserve B20 and B28 and filter other bands.

The directional coupler 183 can mix two RF signals for output. In an implementation, the directional coupler 183 can further have a power allocation function and be configured to divide a power of an input signal into several paths and feed back to a RX port of the RF transceiver 11, such that the RF transceiver 11 can adjust a power of an RF signal transmitted by the RF transceiver 11.

In an implementation, when the RF system 100 works in the 4G mode, the first antenna 141 is configured for TX of the first LB and PRX of the first LB, the first antenna 141 is further configured for TX of the second LB and PRX of the second LB, and the second antenna 142 is configured for DRX of the first LB or the second LB.

Compared with the DP3T switch in FIG. 4, the 3P3T switch in FIG. 5 is made of a mature material and there is no need to add a new material, which can ensure stability of a switch.

Figure 6:
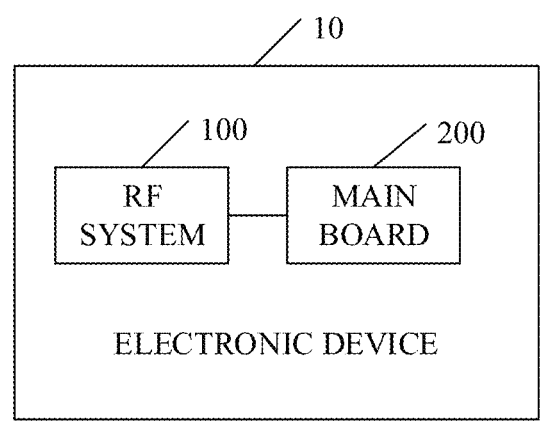
FIG. 6 is a schematic structural diagram of an electronic device provided in implementations of the disclosure.

Refer to FIG. 6, which is a schematic structural diagram of an electronic device provided in implementations of the disclosure. As illustrated in FIG. 6, the electronic device 10 includes the RF system 100 illustrated in FIG. 1 and a main board 200. The first TX module 121, the second TX module 122, the first RX module 123, the second RX module 124, the first duplexer 151, the second duplexer 152, and the first filtering module 16 in the RF system 100 may be disposed on the main board 200. The RF system 100 is configured to perform TX and RX of a first LB and TX and RX of a second LB when working in an NSA mode.

The electronic device includes a processor, a memory, a random access memory (RAM), and a display screen. The memory, the RAM, and the display screen are coupled with the processor.

In addition, the electronic device further includes a speaker, a microphone, a camera, a communication interface, a signal processor, and a sensor. The speaker, the microphone, the camera, the signal processor, and the sensor are coupled with the processor, and the communication interface is coupled with the signal processor.

The display screen can be a liquid crystal display (LCD), an organic light-emitting diode (OLED) or inorganic LED, an active matrix OLED (AMOLED), etc.

The camera can be an ordinary camera, or an infrared camera, or a wide-angle camera, which is not limited herein. The camera can be a front camera or a rear camera, which is not limited herein. The camera may also be a dual camera, for example, an infrared camera+a visible-light camera, or for another example, an ordinary camera+a wide-angle camera. The quantity of cameras may also be two or more than two, which is not limited herein.

The sensor includes at least one of the following: a light sensor, a gyroscope, an infrared proximity sensor, a fingerprint sensor, a pressure sensor, etc. The light sensor, also known as an ambient light sensor, is configured to detect brightness of ambient light. The light sensor may include a photosensitive element and an analog-to-digital converter. The photosensitive element is configured to convert a collected optical signal into an electrical signal, and the analog-to-digital converter is configured to convert the electrical signal into a digital signal. In an implementation, the light sensor can further include a signal amplifier, which can amplify the electrical signal converted by the photosensitive element and then output it to the analog-to-digital converter. The photosensitive element may include at least one of a photodiode, a phototransistor, a photoresistor, or a silicon photocell.

The processor is a control center of the electronic device, which connects all parts of the whole electronic device using various interfaces and lines. By running or executing software programs and/or modules stored in the memory and calling data stored in the memory, the processor can perform various functions of the electronic device and process data, so as to monitor the electronic device as a whole.

The processor can integrate an application processor and a modem processor. The application processor mainly handles with an operating system, a user interface, and an application, and the modem processor mainly handles with wireless communications. It can be understood that the above modem processor may not be integrated into the processor.

The memory is configured to store software programs and/or modules, and the processor executes various functional applications of the electronic device and processes data by running the software programs and/or modules stored in the memory. The memory can mainly include a program storage area and a data storage area. The operating system, software programs required by at least one function, etc. can be stored in the program storage area. Data created according to use of the electronic device and the like can be stored in the data storage area. In addition, the memory may include a high-speed RAM, or may include a non-volatile memory, such as at least one magnetic-disk storage device, flash memory device, or other volatile solid-state storage devices.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A radio frequency (RF) system, comprising:
    an RF transceiver, an RF processing circuit, a transfer switch module, a first antenna, a second antenna, a third antenna, and a fourth antenna;
    wherein the RF transceiver being coupled with the RF processing circuit;
    wherein the first antenna and the second antenna being coupled with the transfer switch module, the third antenna being coupled with the transfer switch module or the RF processing circuit, the fourth antenna being directly coupled with the RF processing circuit, the first antenna and the second antenna each having a higher antenna efficiency than the third antenna and the fourth antenna;
    wherein the RF processing circuit comprising a first transmit (TX) module, a second TX module, a first receive (RX) module, a second RX module, a first duplexer, a second duplexer, a first multiplexer, and a first filtering module;

wherein the first TX module having a first TX port that is coupled with the transfer switch module via the first duplexer, the first TX module having a second TX port that is coupled with the transfer switch module via the first multiplexer and the second duplexer, and the first TX module is configured to switch a connection between the first antenna and the second antenna via the transfer switch module to be coupled with one of the first antenna and the second antenna via the transfer switch module;

wherein the second TX module having a first TX port that is directly coupled with the transfer switch module, the second TX module having a second TX port that is coupled with the transfer switch module via the first multiplexer and the second duplexer, and the second TX module is configured to switch a connection between the first antenna and the second antenna via the transfer switch module to be coupled with another one of the first antenna and the second antenna via the transfer switch module;

wherein the first RX module having a first RX port that is coupled with the transfer switch module via the first duplexer, the first RX module having a second RX port that is coupled with the transfer switch module via the second duplexer, and the first RX module having a third RX port that is coupled with the transfer switch module via the second TX module;

wherein the second RX module having a first RX port that is coupled with the first filtering module; and the second RX module having a second RX port that is coupled with the transfer switch module or a selective filtering module that is coupled with the third antenna; and wherein when the RF system works in a non-standalone (NSA) mode, the first antenna being configured for TX of a first low band (LB) and primary receive (PRX) of the first LB, the second antenna being configured for TX of a second LB and PRX of the second LB, the third antenna being configured for diversity receive (DRX) of the second LB, the fourth antenna being configured for DRX of the first LB, and the first filtering module being configured to filter a band other than the first LB.

2. The RF system of claim 1, wherein when the RF system works in a 4$^{th}$ generation (4G) mode, the first antenna is configured for TX of the first LB and PRX of the first LB, the first antenna is further configured for TX of the second LB and PRX of the second LB, and the second antenna is configured for DRX of the first LB or the second LB.

3. The RF system of claim 2, wherein the third antenna and the fourth antenna are unused, or configured only for LB RX.

4. The RF system of claim 1, wherein an RF path of the first LB comprises a TX path of the first LB, a PRX path of the first LB, and a DRX path of the first LB.

5. The RF system of claim 1, wherein an RF path of the second LB comprises a TX path of the second LB, a PRX path of the second LB, and a DRX path of the second LB.

6. The RF system of claim 2, wherein the first LB comprises a first sub-band or a second sub-band, and the second LB comprises a third sub-band, a fourth sub-band, or a fifth sub-band.

7. The RF system of claim 6, wherein the first sub-band is B20, the second sub-band is B28, the third sub-band is N5 or B5, the fourth sub-band is N8 or B8, and the fifth sub-band is N28 or B28.

8. The RF system of claim 7, wherein in the NSA mode, the first sub-band is B20, the second sub-band is B28, the third sub-band is N5, the fourth sub-band is N8, and the fifth sub-band is N28.

9. The RF system of claim 7, wherein in a 4G mode, the first sub-band is B20, the second sub-band is B28, the third sub-band is B5, the fourth sub-band is B8, and the fifth sub-band is B28.

10. The RF system of claim 1, wherein the transfer switch module comprises one transfer switch.

11. The RF system of claim 10, wherein the transfer switch comprises one of a double pole triple throw (DP3T) switch or a triple pole triple throw (3P3T) switch.

12. The RF system of claim 11, wherein when the transfer switch module comprises the DP3T switch, the second RX port of the second RX module is coupled with the selective filtering module that is coupled with the third antenna.

13. The RF system of claim 11, wherein when the transfer switch module comprises the 3P3T switch, the RF processing circuit further comprises a second multiplexer and a third multiplexer;

wherein the first TX module being coupled with the first antenna via the first duplexer and the transfer switch module includes:
the first TX module being coupled with the first antenna via the first duplexer, the second multiplexer, and the transfer switch module; and
wherein the first TX module being coupled with the first antenna via the first multiplexer, the second duplexer, and the transfer switch module includes:
the first TX module being coupled with the first antenna via the first multiplexer, the second duplexer, the third multiplexer, the second multiplexer, and the transfer switch module.

14. The RF system of claim 1, wherein the first multiplexer comprises a single pole double throw (SPDT) switch.

15. The RF system of claim 13, wherein the second multiplexer and the third multiplexer each are an SPDT switch.

16. The RF system of claim 13, wherein the second RX port of the second RX module is coupled with the transfer switch module.

17. The RF system of claim 6, wherein the selective filtering module comprises a first filter, a second filter, a third filter, a first single pole triple throw (SP3T) switch, and a second SP3T switch;

wherein the first SP3T switch has a P port that is coupled with the second RX port of the second RX module, the first SP3T switch has a first T port that is coupled with a first port of the first filter, the first SP3T switch has a second T port that is coupled with a first port of the second filter, the first SP3T switch has a third T port that is coupled with a first port of the third filter, the first filter has a second port that is coupled with a first T port of the second SP3T switch, the second filter has a second port that is coupled with a second T port of the second SP3T switch, the third filter has a second port that is coupled with a third T port of the second SP3T switch, and the second SP3T switch has a P port that is coupled with the third antenna; and wherein the first filter is configured to filter a band other than the third sub-band, the second filter is configured to filter a band other than the fourth sub-band, and the third filter is configured to filter a band other than the fifth sub-band.

18. The RF system of claim 6, wherein the first filtering module comprises a first SPDT switch, a second SPDT switch, a fourth filter, and a fifth filter;
   wherein the first SPDT switch has a P port that is coupled with the first RX port of the second RX module, the first SPDT switch has a first T port that is coupled with a first port of the fourth filter, the first SPDT switch has a second T port that is coupled with a first port of the fifth filter, the fourth filter has a second port that is coupled with a first T port of the second SPDT switch, the fifth filter has a second port that is coupled with a second T port of the second SPDT switch, and the second SPDT switch has a P port that is coupled with the fourth antenna; and
   wherein the fourth filter is configured to filter a band other than the first sub-band, and the fifth filter is configured to filter a band other than the second sub-band.

19. The RF system of claim 1, wherein the NSA mode comprises any one of an evolved universal mobile telecommunication system (UMTS) terrestrial radio access (E-UTRA) new radio (NR)-dual connectivity (EN-DC) architecture, an NR E-UTRA-DC (NE-DC) architecture, or a next generation (NG) EN-DC architecture.

20. An electronic device comprising:
   a radio frequency (RF) system;
   wherein the RF system comprises an RF transceiver, an RF processing circuit, a transfer switch module, a first antenna, a second antenna, a third antenna, and a fourth antenna;
   wherein the RF transceiver is coupled with the RF processing circuit;
   wherein the first antenna and the second antenna are coupled with the transfer switch module, the third antenna is coupled with the transfer switch module or the RF processing circuit, the fourth antenna is directly coupled with the RF processing circuit, the first antenna and the second antenna each have a higher antenna efficiency than the third antenna and the fourth antenna;
   wherein the RF processing circuit comprises a first transmit (TX) module, a second TX module, a first receive (RX) module, a second RX module, a first duplexer, a second duplexer, a first multiplexer, and a first filtering module;
   wherein the first TX module has a first TX port that is coupled with the transfer switch module via the first duplexer, the first TX module has a second TX port that is coupled with the transfer switch module via the first multiplexer and the second duplexer, and the first TX module is configured to switch a connection between the first antenna and the second antenna via the transfer switch module to be coupled with one of the first antenna and the second antenna via the transfer switch module;
   wherein the second TX module has a first TX port that is directly coupled with the transfer switch module, the second TX module has a second TX port that is coupled with the transfer switch module via the first multiplexer and the second duplexer, and the second TX module is configured to switch a connection between the first antenna and the second antenna via the transfer switch module to be coupled with another one of the first antenna and the second antenna via the transfer switch module;
   wherein the first RX module has a first RX port that is coupled with the transfer switch module via the first duplexer, the first RX module has a second RX port that is coupled with the transfer switch module via the second duplexer, and the first RX module has a third RX port that is coupled with the transfer switch module via the second TX module;
   wherein the second RX module has a first RX port that is coupled with the first filtering module, and the second RX module has a second RX port that is coupled with the transfer switch module or a selective filtering module that is coupled with the third antenna; and
   wherein the RF system is configured to perform TX and RX of a first low band (LB) and perform TX and RX of a second LB when working in a non-standalone (NSA) mode.

* * * * *